Sept. 6, 1938.　　　　J. F. SCHOTT　　　　2,129,607
METHOD OF MAKING RUBBER ARTICLES
Filed April 8, 1935　　　2 Sheets-Sheet 1
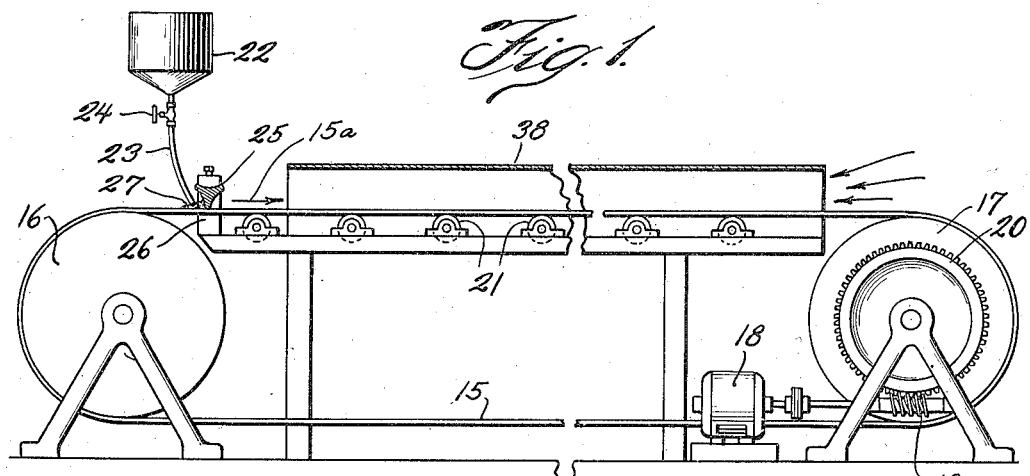
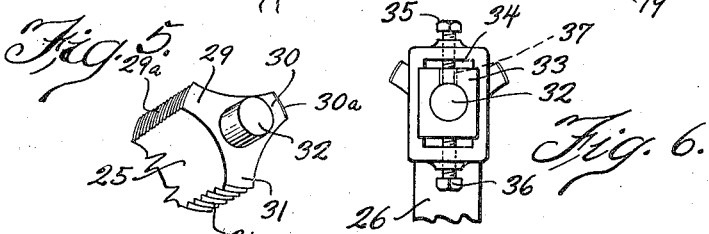
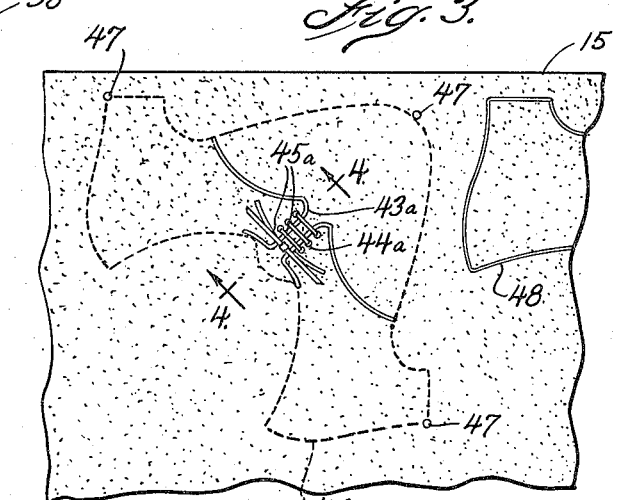
Inventor:
John F. Schott
By Eugene M. Giles atty.

Sept. 6, 1938.  J. F. SCHOTT  2,129,607
METHOD OF MAKING RUBBER ARTICLES
Filed April 8, 1935   2 Sheets-Sheet 2
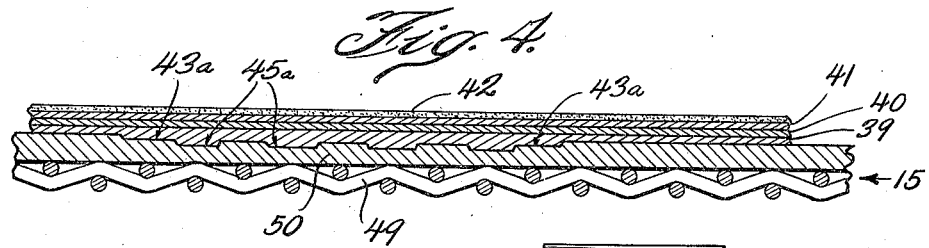
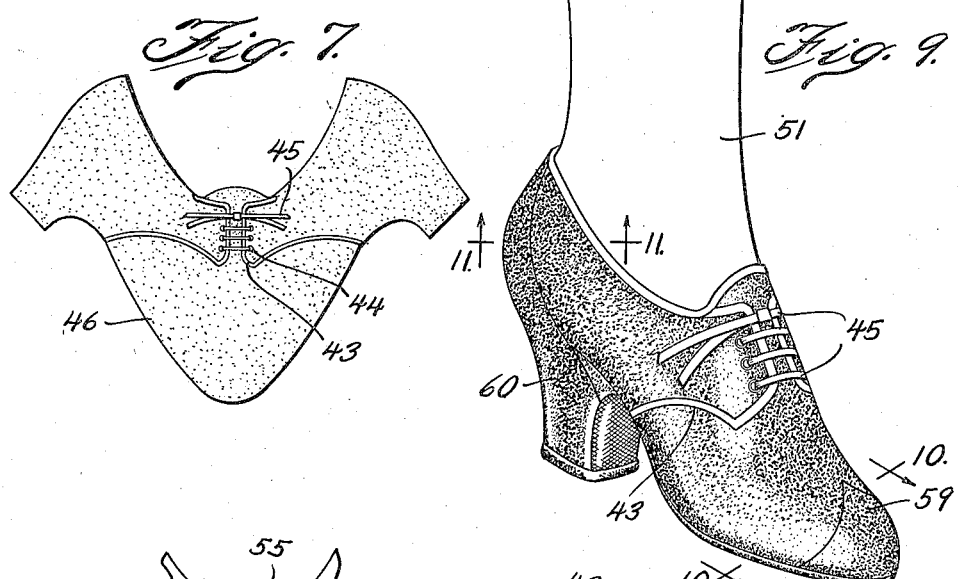
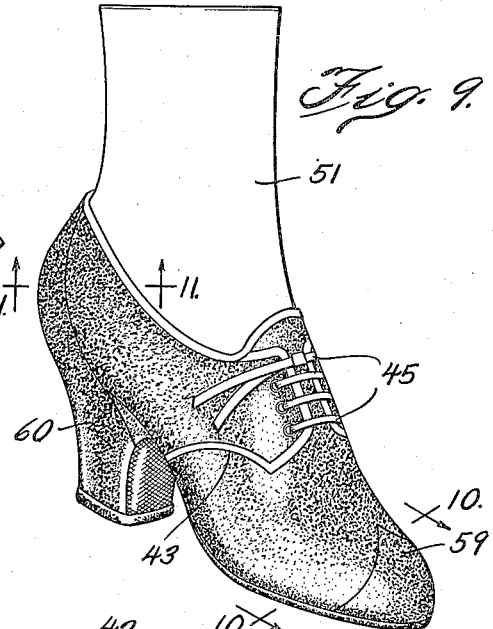
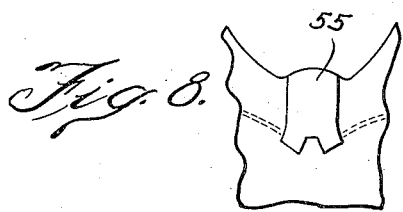
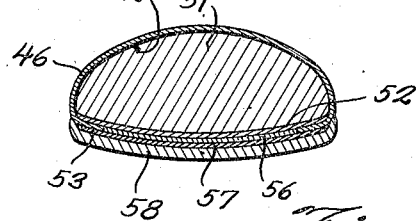
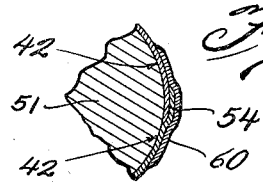
Inventor:
John F. Schott
By Eugene M. Giles atty.

Patented Sept. 6, 1938

2,129,607

UNITED STATES PATENT OFFICE 2,129,607

METHOD OF MAKING RUBBER ARTICLES

John F. Schott, Mishawaka, Ind., assignor to Mishawaka Rubber and Woolen Manufacturing Company, Mishawaka, Ind., a corporation of Indiana Application April 8, 1935, Serial No. 15,276

6 Claims. (Cl. 18—59)

My invention relates to sheet rubber articles, such, for example, as rubber footwear, and has reference more particularly to a sheet rubber and the means for and method of making same with properties and characteristics which facilitate the making of and improve the rubber article.

In the manufacture of sheet rubber articles, such as footwear, it is desirable to produce them direct from rubber latex or other suitable aqueous dispersion of rubber without the plasticizing or milling operations that have been employed heretofore to prepare the sheet rubber from which such articles were made. I have found, however, that in making many articles with the direct latex procedure it is preferable to follow the fabricating and assembling practice employed with milled rubber sheets if the latex is properly prepared in a sheet form that is suitable for the purpose. This not only permits rapid production and, by simple and continuous operations, of uniform sheet stock which may be prepared in advance and stored on reels or otherwise, but it also permits the making up of articles therefrom by workmen who are already skilled in sheet rubber fabricating and assembling operations and with the same lasts, forms and equipment that are used in the making of articles from milled sheet rubber. Moreover, the sheet rubber manufacturing procedure lends itself advantageously to the reinforcing and stiffening of rubber articles at selected places by overlapping the sheet rubber parts or adding rubber or fabric pieces where required and, by first preparing the latex in sheet form, various trimmings, ornamental configurations, and surface designs or patterns and the like may be readily provided on the finished articles without material change in equipment, expense or delay. Furthermore, by this procedure the thickness of the sheet rubber may be controlled with much greater accuracy and uniformity than in the dipping methods that are commonly employed.

However, rubber parts that are made directly from latex have the peculiarity that they do not unite well and when two latex parts are joined together in the usual manner of uniting rubber parts it makes an unsatisfactory joint. I have found, however, that if one of the latex surfaces that are to be joined together has been initially prepared with a suitable coating or lamination as hereinafter explained, such coated surface will readily unite by ordinary rubber joining methods with the other latex surface and insure a secure and satisfactory joint.

The principal objects of my invention are to provide an improved sheet rubber from which footwear and other articles may be conveniently and satisfactorily made; to produce the sheet rubber direct from latex or the like; to insure accurate and uniform thickness of the sheet rubber; to permit use, in the direct production of articles from latex, of the same methods of fabrication and assembling, and with the same equipment as heretofore used in making rubber articles from milled rubber sheets; to facilitate the provision of the rubber articles with trimmings, ornamentation, surface designs or patterns, and the like; to insure a permanent and inseparable union of the latex sheet parts in the finished article; and in general to provide improved rubber articles, such as rubber footwear, as well as an improved method and improved means for making same,—these and other objects being accomplished as disclosed hereinafter and as shown in the accompanying drawings in which,—

Fig. 1 is a side view, with intermediate part broken away, of apparatus for making a latex sheet;

Fig. 2 is a top view of the receiving end of the apparatus of Fig. 1;

Fig. 3 is a top view, somewhat enlarged, of a fragmentary portion of the belt or carrier of the apparatus shown in Figs. 1 and 2;

Fig. 4 is an enlarged sectional view of the belt, taken on the line 4—4 of Fig. 3, and showing successive rubber coatings thereon;

Fig. 5 is a perspective view of a fragmentary end portion of the spreader bar for regulating the thickness of the coating;

Fig. 6 is a fragmentary view of the end mounting for the spreader bar;

Fig. 7 is a plan view of a shoe making blank cut from a sheet of rubber that has been formed on the belt of Fig. 4;

Fig. 8 is a fragmentary portion of said blank showing the reverse side with a reinforcing patch that is preferably applied thereto before assembling in the shoe;

Fig. 9 is a perspective view of a shoe assembly on a last and made up with a blank like that of Fig. 7;

Fig. 10 is an enlarged sectional view on the line 10—10 of Fig. 9; and

Fig. 11 is an enlarged fragmentary sectional view of the joint at the rear of the shoe, taken on the line 11—11 of Fig. 9.

The prevailing practice in making footwear and similar articles direct from rubber latex is to use a form of a shape and size corresponding to the desired article and to coat the form, and any parts that have been preliminarily assembled thereon, with the latex, as for example, by dipping the form in latex that has been prepared in suitable liquid consistency with fillers, coloring materials, vulcanizing ingredients, etc. as desired, it being a common practice to build up the rubber coating to the required thickness by repeated dippings or applications of the latex compound.

With my invention the making of the articles from the latex is somewhat less direct than in the above mentioned prevailing practice in the respect that I first make sheet material of the latex and then make up or fabricate the particular article from appropriate blanks or pieces of the latex sheet, by which procedure I obtain the benefits and advantages of the above mentioned prevailing practice of direct manufacture from latex without certain objectionable features thereof and at the same time have the benefits and advantages incident to the old practice of fabricating such articles from milled rubber sheets by assembling pieces of the sheet rubber and other parts in the most advantageous manner.

To prepare the latex in the sheet form, I prefer to employ a belt of suitable width, indicated at 15 in the accompanying drawings, which is trained around drums 16 and 17, to the latter of which power is applied in any convenient manner, as for example, by the motor 18 through the worm 19 and worm wheel 20, to operate the belt at a moderate and constant rate of speed in the direction indicated by the arrow 15ª.

The outer surface of the belt 15 is of suitable character to temporarily receive thereon a coating of latex which upon drying and setting in sheet form is stripped therefrom, and the upper length of the belt is preferably supported on a series of rollers 21 or in any other convenient manner so as to prevent sagging and keep it level during the sheet formative period of the latex which is deposited on the belt at the starting end of the upper length thereof.

For supplying the latex to the belt, one or more receptacles 22 may be located thereabove with spouts 23 which are controlled by valves 24 and extend downwardly to discharge at suitable intervals across the width of the belt immediately behind a spreader bar 25 which may be mounted for vertical adjustment on brackets 26 and serves to regulate the thickness of the latex coating that is applied on the belt. In practice the valves 24 are adjusted to permit accumulation of a small bank of latex, as indicated at 27, along the rear of the spreader bar 25 and nozzles 28 are provided adjacent the opposite edges of the belt and connected with a source of compressed air so as to direct air jets against the opposite ends of the banked latex 27 to prevent overflow thereof at the edges of the belt.

The spreader bar 25 may be of any desired form, but I prefer to employ a bar that is longitudinally fluted as shown in Fig. 5 to provide three flanges 29, 30 and 31 which have transversely threaded or grooved outer edge faces 29ª, 30ª and 31ª with the threads or grooves of each edge face of a different size, for example 25 to the inch, 30 to the inch and 48 to the inch respectively, and this bar 25 is rotatable so as to present any selected edge face toward the top surface of the belt 15. The thickness of the applied coating varies with the size of the threads or grooves,—that is the coarse threads permit more latex to be applied than the fine threads,—and by rotatably adjusting the bar 25 the laminations may be varied to suit drying conditions and to regulate the number of laminations and final thickness of the completed latex sheet.

The spreader bar 25 is formed at each end with a trunnion 32 which is engaged in an opening of a bearing block 33 of the respective bracket 26 which said bracket is formed with a vertical slideway 34 in which the block 33 is vertically movable by upper and lower adjusting screws 35 and 36 respectively, the latter of which bears against the bottom face of the block 33. The upper screw 35, however, extends loosely through an opening 37 so as to seat against the trunnion 32 and in this manner serves not only to hold the block 33 in the selected position of vertical adjustment, but also locks the spreader bar 25 in any position of its rotary adjustment in the bearing blocks 33.

The material used for this coating operation may be a natural or artificial rubber latex or other suitable aqueous dispersion or liquid form of rubber and compounded with suitable fillers, pigments and vulcanizing ingredients to produce a sheet rubber of the character required for the particular articles to be made therefrom, and the material is of proper consistency to flow and spread sufficiently freely to provide a thin coating, which after application by the spreader 25 is dried on the belt. It may be dried in the open, but to expedite the drying operation, I prefer to provide a drying compartment 38 through which the coated belt passes in contact with warm air which is supplied in any convenient manner to the interior of the drier, preferably at the outlet end of the drier as indicated by the group of arrows, and circulated therethrough.

The latex coating that is applied on the belt may be of suitable thickness so that a single coating will produce a rubber sheet of the required thickness, in which case the rubber sheet is stripped from the belt 15 after it has passed through the drier 38. In most cases, however, unless the rubber sheet is to be exceedingly thin, I prefer to make up the rubber sheet of successive superimposed coatings as indicated at 39, 40 and 41 respectively in Fig. 4, and each coating is subjected to the drying operation before another coat of latex is applied thereon. Successive thin coatings are desirable as they dry more readily, and moreover a sheet rubber made up of successive coatings or laminations not only resists tearing more effectively than a sheet of a single coating or lamination, but any imperfections such as blisters, defects or grains of foreign matter present in one lamination are localized in the particular lamination and do not extend through the entire sheet. If the coating or layer is too thick the surface will skin over when heated and the moisture underneath will have difficulty in escaping and if the belt is provided with depressions as hereinafter indicated for the purpose of forming surface designs or configurations on the rubber sheet, a thick initial coating is undesirable as it will trap air down in these depressed portions of the belt.

The successive coating operations may be accomplished by carrying the initial coating 39 through the drier 38 and then back with the return length of the belt to the latex spreader 25 where the second coat 40 is applied directly on the dried first coat 39 and passed through the drier 38 and then in like manner the third coat 41 is applied over the second coat 40 and so on until a rubber sheet of the desired thickness is built up, whereupon the supply of latex is discontinued and after the final latex coating has passed through the drier 38 the composite rubber sheet that has been formed in an endless band by this procedure is cut apart and stripped from the belt. The spreader bar 25 may be slightly elevated after each coating to compensate for the slightly elevated surface resulting from the previous coating, but I have found that this is not essential if the spreader bar 25 is located over the belt at a place where the belt is not unyieldingly supported as in the illustrated structure, in which the spreader bar 25 is located over the belt between the take-off from the drum 16 and the first roller 21, at which place the belt yields sufficiently to allow for successive coatings to build up the thickness of rubber that is ordinarily required. The spreader bar 25 may, of course, be turned if desired to present a differently grooved face and thus vary the thickness of any coating or lamination.

Instead of carrying the latex coatings back through the same latex spreader and drier and forming the latex sheets in separate lengths as in the above procedure, the latex sheet may be made by a continuous process and in any desired length by providing a suitable length of belt 15 with successive sets of latex coating devices 22, 23, 25 and driers 38 therealong so that after the initial coating has been supplied by a coating device 22, 23, 25 and passed through a drier 38, it proceeds to another similar coating device and drier which applies and dries the second coating and so on until the required number of coatings have been applied and dried, after which the sheet is progressively stripped from the belt upon leaving the last drier.

These latex sheets are prepared more conveniently and with much less expense for equipment than milled rubber sheets and are far superior thereto, but the latex sheet has the disadvantage that in fabricating articles therefrom it does not adhere as readily to the same material and make as satisfactory a joint as the milled rubber sheet. An important feature of my invention is that I have found that this objectionable feature of the latex sheet may be readily and completely overcome by applying to the latex sheet a final lamination or coating of solvent rubber cement as indicated in 42 in Fig. 4. This rubber cement is prepared in the usual manner by dissolving ground rubber in a suitable solvent such as naphtha, gasoline or the like, and is preferably applied to the latex sheet while the latter is still warm from the final drying operation as its effectiveness is greatly increased if applied at that time. This cement may be applied in any convenient manner, as, for example, by means of a brush, or by a coating device similar to that employed for supplying and spreading the latex, said device preferably being located and arranged to apply the rubber cement to the latex sheet on the belt 15 as it emerges from the final drying operation in the drier 38.

For some purposes the latex sheet may be provided with a layer of milled rubber and in such cases I contemplate applying on the latex sheet a sheet of the ordinary milled and calendered rubber which is pressed or rolled into intimate cohesive relation with the latex sheet, preferably while the latter is warm and with or without previous application of the rubber cement coating 42 as desired.

By this procedure, a sheet rubber stock may be provided with a body layer of a highly compounded or a cheaper grade of rubber produced in accordance with the usual milling and calendering practice and with a facing layer of superior quality made directly from latex, and as the milled rubber layer readily sticks to the surface of a latex sheet, parts or blanks made from the laminated latex and milled rubber sheet may be united to make a much better joint than if latex sheet surfaces are brought directly together in making the joint.

Oftentimes, it is desired that the articles made from the sheet rubber have a surface design, ornamental trimmings or reinforcing elements thereon as for example, in the case of rubber footwear it may be preferred that the exposed surface of the rubber have an appearance simulating leather as indicated by the mottled showing of Fig. 9, with markings thereon simulating the usual vamp, quarters, toe tips, bindings, laces, etc. of leather shoes, all of which said markings are readily provided with my present procedure, as it is merely necessary to form the surface of the belt 15 with the reverse of the design, ornamentation, or the like that is to appear on the finished article. Thus in the case of the shoe of Fig. 9, which is to have the marking 43 to represent a common arrangement of quarters and vamp of a leather shoe and the markings 44 and 45 which simulate lacing eyelets and laces respectively thereof, the belt is provided as shown in Figs. 3 and 4, with a surface that is a negative replica of the leather-like surface that the shoe is to have and is also provided with recesses 43ª, 44ª and 45ª that are a negative simulation or representation of the quarter and vamp marking, lacing eyelets and laces respectively of the shoe, and when the latex is spread on the surface of the belt it conforms to all the surface markings and recesses of the belt and produces on the finished surface of the rubber sheet a surface pattern with trimmings, etc. that is the reverse or a positive of the markings and recesses of the belt surface.

Pieces or blanks are cut from the finished latex sheet of proper configuration for fabricating the shoe, as for example, like the piece 46 shown in Fig. 7 and it is of course, necessary to cut out these pieces or blanks so that the markings 43, 44 and 45 will be arranged on the piece or blank to appear at the proper place on the finished shoe. This can be accomplished by using the markings 43, 44 and 45 as a guide in the cutting operation, or the belt 15 may have small recesses 47 suitably located with respect to the configuration of the blank as represented by the dotted lines 46ª in Fig. 3, so that the finished sheet has index marks which correspond to the recesses 47 and serve to facilitate the proper location of the cutting die to produce the piece or blank 46 with the markings 43, 44 and 45 properly located thereon. Instead of the small recesses 47, other means may, of course, be provided for the same purpose, as for example, a shallow recess 48 in the belt 15 which will provide on the latex sheet a slightly raised outline defining the configuration of and the place where the blank 46 should be cut from the latex sheet.

The belt 15 on which the latex sheet is formed may be of any desired construction that will serve the purpose and the negative representation of the surface finish, trim features 43, 44, 45, etc. may be provided in any desired manner, as for example, by engraving. I prefer, however, to make the belt 15 of a stout fabric backing 49 with a coating 50 of relatively hard rubber in the exposed surface of which the markings are provided. Such belt may be made up conveniently by first providing a sheet of material, such for example, as leather, having a surface that is to be simulated in the finished shoe, and with strips of fabric or other material arranged on the surface of this leather sheet at proper places, to have the appearance of the edges, eyelets, laces, etc. of a leather type shoe. Indexing features may also be provided to produce the index markings 47 or 48 if desired. Latex, properly compounded to produce a suitable hard rubber is then flowed on and spread over the surface of the leather sheet, allowed to dry thereon and vulcanized, thus producing a hard rubber sheet which has an exact negative reproduction of the leather surface and the trimmings and other features that were present on the leather surface. This hard rubber negative is then secured to the surface of the fabric backing 49, preferably by cementing or in other desired manner, and it is to be understood that the hard rubber sheet for covering the fabric backing may, if desired, be made in sections and these sections secured to the backing 49 to conjointly cover the outer surface of said backing.

In making up articles from the latex sheet that has been prepared on the belt 15, substantially the same procedure and equipment is employed as in the fabrication of articles from milled rubber sheet. For example, in making a shoe from the latex sheet, an ordinary plain last 51 is employed and a rubberized fabric insole 52 placed on the sole face of the last, after which the latex blank 46 is shaped around the last in the usual manner and lasted over and cemented to the edge portion of the insole 52 in the usual manner as indicated at 53 and the ends of the blank 46 are lapped, cemented and rolled together at the back in the usual manner as indicated at 54 in Fig. 11. Preferably, before assembling, the blank is provided on the inner side with a reinforcing piece 55 of fabric or latex sheet material which is cemented in place and serves to strengthen the finished rubber shoe at the place where the principal strain occurs in applying and removing the shoe. A filler 56 of rag stock and a middle sole layer 57 are then cemented in place,—the middle sole layer 57 preferably consisting of fabric with a thin top coating of rag stock and with the filler 56 previously attached thereto,—and then the outer sole 58 is cemented in place with the edges thereof rolled up in intimate adhesive contact with the lower edges of the side wall portion of the assembled blank 46, after which the shoe is vulcanized in the usual manner. The shoe may also be provided with a toe tip 59 and heel piece 60 which may be formed by making the belt 15 with suitable recesses to increase the thickness of the rubber sheet at proper places and over a properly shaped area to give the finished shoe this toe tip and heel piece effect, but it is preferred to cut these pieces 59 and 60 from the latex sheet and apply them on the upper in the process of assembling the shoe on the last. It would not be possible to cause these pieces to stick securely to the latex sheet upper except for the fact that when cut from a latex sheet that has been made as indicated hereon, these pieces have their under side prepared with a coating 42 of rubber in a form to provide the latex sheet with junction properties that are lacking in latex sheets that are not previously prepared with a coating or lamination 42.

Upon completion, the shoe thus constructed, will have a surface finish simulating leather or other material, that was given to the latex sheet in its preparation on the belt 15 and will also have thereon the formations 43, 44 and 45 likewise produced on the latex sheet by the belt 15, and by reason of this surface finish and these formations will simulate the appearance of a leather shoe.

From the foregoing it will be understood that I have not only provided a simple, convenient and comparatively inexpensive method of producing articles direct from latex which avoids certain inconvenience and expense of other methods of direct latex production and utilizes the advantageous features of and facilities for fabrication of such articles from milled rubber sheets, but I also insure a permanent and inseparable union of the latex sheet parts in the finished article and permit convenient and comparatively inexpensive reproduction of any surface designs, trim or ornamentation that may be desired. Moreover it is to be noted that when the sheet rubber is provided, as indicated herein, with such surface designs, trim or ornamentation, the reverse face of the sheet is smooth surfaced and does not have the pits and depressions that occur when a film is deposited on an embossed surface by dipping or similar previous practices.

While I have shown and described my invention in a preferred form and in connection with footwear, I am aware that it may be used in the making of other articles and that various changes and modifications may be made without departing from the principles of my invention, the scope of which is to be determined by the appended claims.

I claim as my invention:

1. The method of making rubber articles which comprises drying a layer of an aqueous dispersion of rubber with heat to form a sheet, coating the sheet before substantial cooling with a rubber composition having better rubber union properties than the sheet, then shaping the sheet into the article form and uniting and consolidating overlapping portions of the coated sheet.

2. The method of making rubber articles which comprises drying a layer of an aqueous dispersion of rubber with heat to form a sheet, coating the sheet before substantial cooling with a solvent rubber cement, then shaping the sheet into the article form and uniting and consolidating coated portions thereof.

3. The method of making rubber articles which comprises providing a flat matrix with separate groups of mold cavities corresponding to a predetermined design, spreading an aqueous dispersion of rubber on said matrix to a depth to form a sheet with the separate designs thereon, drying the rubber with heat and before substantial cooling thereof coating the sheet with a solvent rubber cement, then dividing the dried sheet into blanks so that the designs are correspondingly located on the blanks, then shaping the blanks in article form so that the designs are located at predetermined selected places on the articles, then joining and consolidating coated portions of the blanks.

4. The method of manufacturing composite rubber articles which comprises applying a surfacing of masticated rubber to a pre-heated layer of dried rubber latex sheet material.

5. The method of manufacturing composite rubber articles which comprises applying a surfacing of masticated rubber to a pre-heated layer of dried rubber latex sheet material, thereafter dividing the sheet material into blanks, then cementing a masticated rubber surface of the blank to a latex surface thereof and then vulcanizing the article.

6. The method of manufacturing composite rubber articles which comprises making sheet material directly from rubber latex and while said sheet material is in the process of production affixing thereto a surfacing of masticated rubber, thereafter dividing the sheet material into blanks and cementing and vulcanizing the masticated rubber surface of the blank to a latex surface thereof.

JOHN F. SCHOTT.